United States Patent
Hamada et al.

(10) Patent No.: US 10,425,176 B2
(45) Date of Patent: Sep. 24, 2019

(54) VEHICLE COMMUNICATION SYSTEM AND VEHICLE-MOUNTED DEVICE

(71) Applicants: SUMITOMO ELECTRIC INDUSTRIES, LTD., Osaka-shi, Osaka (JP); SUMITOMO WIRING SYSTEMS, LTD., Yokkaichi-shi, Mie (JP); AUTONETWORKS TECHNOLOGIES, LTD., Yokkaichi-shi, Mie (JP)

(72) Inventors: Yoshihiro Hamada, Osaka (JP); Makoto Saburi, Yokkaichi (JP); Ryota Yoshida, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 0 days.

(21) Appl. No.: 15/768,295

(22) PCT Filed: Oct. 19, 2016

(86) PCT No.: PCT/JP2016/080915
§ 371 (c)(1),
(2) Date: Apr. 13, 2018

(87) PCT Pub. No.: WO2017/069138
PCT Pub. Date: Apr. 27, 2017

(65) Prior Publication Data
US 2018/0316445 A1 Nov. 1, 2018

(30) Foreign Application Priority Data
Oct. 21, 2015 (JP) .................. 2015-207269

(51) Int. Cl.
*H04W 24/00* (2009.01)
*H04B 17/318* (2015.01)
(Continued)

(52) U.S. Cl.
CPC .......... *H04B 17/318* (2015.01); *B60R 25/24* (2013.01); *B60R 25/245* (2013.01); *G01S 5/02* (2013.01);
(Continued)

(58) Field of Classification Search
CPC ...... H04W 64/00; B60R 25/209; B60R 25/24; H04B 17/318
(Continued)

(56) References Cited

U.S. PATENT DOCUMENTS 9,666,005 B2 * 5/2017 Ellis .................. G07C 9/00309
9,894,492 B1 * 2/2018 Elangovan ........... H01Q 1/3241
(Continued)

FOREIGN PATENT DOCUMENTS

EP 2 492 876 A2 8/2012
JP 2004-084406 A 3/2004
(Continued)

OTHER PUBLICATIONS

Jan. 17, 2017 International Search Report issued in International Patent Application No. PCT/JP2016/080915.

*Primary Examiner* — Khoi H Tran
*Assistant Examiner* — B M M Hannan
(74) *Attorney, Agent, or Firm* — Oliff PLC

(57) ABSTRACT

A vehicle communication system comprising a vehicle-mounted device that transmits signals from a plurality of transmitting antennas on a vehicle; and a mobile device that receives signals transmitted from the vehicle-mounted device and transmits a response signal including received signal strengths of received signals. The transmitting anten-
(Continued)

nas include: a first transmitting antenna in the vehicle cabin which is deviated in one direction in the width direction of the vehicle from the central portion in the width direction; and a second transmitting antenna nearer to the other side surface in the width direction of the vehicle. The device determines whether or not the mobile device is present inside an area containing the vehicle interior space and having a boundary surface following at least one side surface in the width direction of the vehicle, based on received signal strengths of signals transmitted from the first transmitting antenna and the second transmitting antenna.

7 Claims, 14 Drawing Sheets

(51) Int. Cl.
  *B60R 25/24* (2013.01)
  *G01S 5/02* (2010.01)
  *H04W 64/00* (2009.01)
  *H04B 17/21* (2015.01)
  *H04B 17/27* (2015.01)
  *B60R 25/20* (2013.01)

(52) U.S. Cl.
  CPC ............. *H04B 17/21* (2015.01); *H04B 17/27* (2015.01); *H04W 64/00* (2013.01); *B60R 25/209* (2013.01)

(58) Field of Classification Search
  USPC ................................................ 455/456.1–457
  See application file for complete search history.

(56) References Cited

U.S. PATENT DOCUMENTS

| | | | |
|---|---|---|---|
| 2007/0188301 A1* | 8/2007 | Nakajima | B60R 25/24 340/5.61 |
| 2009/0153295 A1 | 6/2009 | Hamada | |
| 2011/0148573 A1* | 6/2011 | Ghabra | B60R 25/245 340/5.61 |
| 2016/0371906 A1* | 12/2016 | Fujiyama | B60R 25/245 |

FOREIGN PATENT DOCUMENTS

| | | |
|---|---|---|
| JP | 2008-184849 A | 8/2008 |
| JP | 2009-144367 A | 7/2009 |
| JP | 2011-144624 A | 7/2011 |
| JP | 2012-122249 A | 6/2012 |
| JP | 2012-177242 A | 9/2012 |
| JP | 2013-100672 A | 5/2013 |
| JP | 2015-013527 A | 1/2015 |
| JP | 2015-113643 A | 6/2015 |

* cited by examiner

F I G. 7
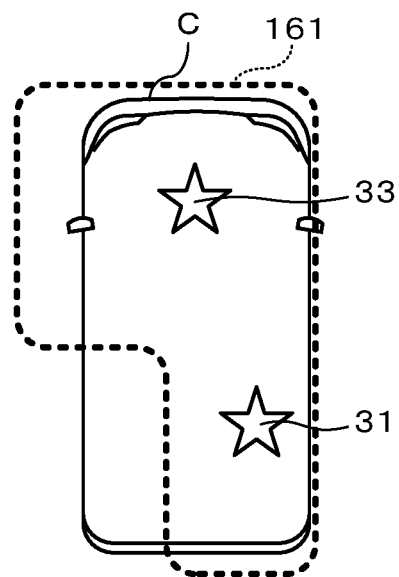

VEHICLE COMMUNICATION SYSTEM AND VEHICLE-MOUNTED DEVICE

CROSS-REFERENCE TO RELATED APPLICATIONS

This application is the national phase under 35 U. S. C. § 371 of PCT International Application No. PCT/JP2016/080915 which has an International filing date of Oct. 19, 2016 and designated the United States of America.

FIELD

The present application relates to a vehicle communication system and a vehicle-mounted device.

The present application claims priority based on Japanese Patent Application No. 2015-207269 filed on Oct. 21, 2015, and all the contents described in the above Japanese patent application are adopted herein.

BACKGROUND

Vehicle communication systems to lock and unlock a vehicle door without the use of a mechanical key have been in practical use. Specifically, such systems as follows have been in practical use: a keyless entry system to lock or unlock a vehicle door by a radio remote control operation using a mobile device carried by the user; and a smart entry (trademark) system to unlock a vehicle door by the user who are carrying the mobile device only approaching the vehicle or grasping a door handle.

Moreover, a vehicle communication system to start the engine of the vehicle without the use of a mechanical key has also been in practical use. Specifically, a push start system to start the engine by the user who are carrying the mobile device only pressing an engine start button has been in practical use.

In the above communication systems, while the vehicle-mounted device performs communication with the mobile device by a radio signal, performs authentication and then, performs control relates to a predetermined operation such as unlocking, locking or engine starting, in order to prevent an invalid operation, before performing the operations, whether the mobile device is present in a predetermined position or not is determined. As methods for checking the position of the mobile device, the methods described in Japanese Patent Application Laid-Open Publication No. 2009-144367, Japanese Patent Application Laid-Open Publication No. 2015-13527 and so on are known.

Japanese Patent Application Laid-Open Publication No. 2009-144367 discloses a position detection method in which a signal is transmitted from a transmitting antenna provided in the vehicle cabin and whether the mobile device is present inside the vehicle cabin or not is determined based on whether the mobile device responds to the signal or not. The signal transmitted from the transmitting antenna has a predetermined signal intensity, and the signal intensity is set to an intensity such that the mobile device can receive the signal when it is present inside the vehicle cabin and cannot receive the signal when it is present outside the vehicle cabin. Since the reachable range of signals having the same intensity spreads substantially in a spherical shape with the transmitting antenna as the center, it is desirable that the transmitting antenna be disposed substantially on the center line in the width direction of the vehicle. However, on the center line in the width direction of the vehicle, various devices such as a console and a parking brake are sometimes disposed, and there are cases where the transmitting antenna cannot be disposed on the center line in the width direction and is disposed on the right side or the left side in the width direction. When the transmitting antenna is disposed on the right side, if the signal intensity is set so that the signal reaches the right side surface of the vehicle, the signal does not reach the left side surface, so that there are cases where the mobile device present in the neighborhood of the left side surface inside the vehicle cabin is erroneously determined to be present outside the vehicle cabin. Moreover, if the signal intensity is set so that the signal reaches the left side surface of the vehicle, the signal reaches the outside of the right side surface of the vehicle cabin, so that there are cases where the mobile device present in the neighborhood of the right side surface outside the vehicle cabin is erroneously determined to be present inside the vehicle cabin. As a technology to solve this problem, Japanese Patent Application Laid-Open Publication No. 2009-144367 discloses a structure in which when a request switch on the right side surface of the vehicle is operated, switching is made to a signal intensity so that the signal reaches the right side surface of the vehicle and when a request switch on the left side surface is operated, switching is made to a signal intensity so that the signal reaches the left side surface of the vehicle.

Japanese Patent Application Laid-Open Publication No. 2015-13527 discloses a radio communication system in which a signal is transmitted from a transmitting antenna provided in the vehicle cabin to a mobile device, the mobile device is determined to be present outside the vehicle cabin when the received signal strength of the signal received by the mobile device is less than a threshold value and the mobile device is determined to be present inside the vehicle cabin when the intensity is not less than the threshold value.

In particular, Japanese Patent Application Laid-Open Publication No. 2015-13527 discloses a technology in which whether the mobile device is present in the neighborhood of a side surface of the vehicle or not is conjectured by using a transmitting antenna provided outside the vehicle cabin, the threshold value is set to a high value when the mobile device is present in the neighborhood of the side surface and the threshold value is set to a low value when the mobile device is not present in the neighborhood of the side surface.

On the other hand, as a general method for determining the position of a mobile device, Japanese Patent Application Laid-Open Publication No. 2013-100672 discloses a vehicle-mounted communication system in which the vehicle interior area is divided into a plurality of areas and the received signal strengths of a plurality of vehicle-mounted antennas received by the mobile device in each area are compared with a threshold value to determine whether the mobile device is present in the area.

Moreover, Japanese Patent Application Laid-Open Publication No. 2012-177242 discloses an electronic key system in which a plurality of LF oscillators that transmit signals of intensities that can reach a range containing the vehicle interior space are provided and when a response signal from the mobile device to the signals transmitted from the plurality of LF oscillators is present, the mobile device is determined to be present inside the vehicle cabin.

SUMMARY

A vehicle communication system according to one aspect of the present disclosure comprises: a vehicle-mounted device that transmits signals from a plurality of transmitting antennas provided on a vehicle; and a mobile device that receives the signals transmitted from the vehicle-mounted device and transmits a response signal including received signal strengths of the received signals, in which the vehicle-mounted device receives the response signal transmitted from the mobile device and determines whether the mobile device is present inside a vehicle cabin or not based on the received signal strengths included in the received response signal, wherein the plurality of transmitting antennas include: a first transmitting antenna provided in the vehicle cabin so as to be deviated in one direction in a width direction of the vehicle from a central portion in the width direction; and a second transmitting antenna provided nearer to the other side surface in the width direction of the vehicle, and the vehicle-mounted device is provided with an inside-or-outside-area determination unit that determines whether or not the mobile device is present inside an area containing a vehicle interior space and having a boundary surface following at least one side surface in the width direction of the vehicle, based on the received signal strengths of the signals transmitted from the first transmitting antenna and the second transmitting antenna, respectively.

A vehicle-mounted device according to one aspect of the present disclosure that transmits signals from a plurality of transmitting antennas provided on a vehicle to a mobile device and determines whether the mobile device is present inside a vehicle cabin or not based on received signal strengths of the signals received by the mobile device, wherein the plurality of transmitting antennas include: a first transmitting antenna provided in the vehicle cabin so as to be deviated in one direction in a width direction of the vehicle from a central portion in the width direction; and a second transmitting antenna provided nearer to the other side in the width direction of the vehicle, and the vehicle-mounted device is provided with an inside-or-outside-area determination unit that determines whether or not the mobile device is present inside an area containing a vehicle interior space and having a boundary surface following at least one side surface in the width direction of the vehicle, based on the received signal strengths of the signals transmitted from the first transmitting antenna and the second transmitting antenna, respectively.

The present application not only may be implemented as a vehicle communication system and a vehicle-mounted device provided with such characteristic processing portions but may be implemented as a vehicle communication method with such characteristic processing as steps or may be implemented as a program for causing a computer to execute such steps. Moreover, the present application may be implemented as a semiconductor integrated circuit that implements part or the whole of the vehicle communication system and the vehicle-mounted device, or may be implemented as a different system including the vehicle communication system and the vehicle-mounted device.

The above and further objects and features will more fully be apparent from the following detailed description with accompanying drawings.

BRIEF DESCRIPTION OF THE DRAWINGS

FIG. 7 is a conceptual view showing a first area when only the signals of first and third transmitting antennas are used.

DETAILED DESCRIPTION

Figure 1:
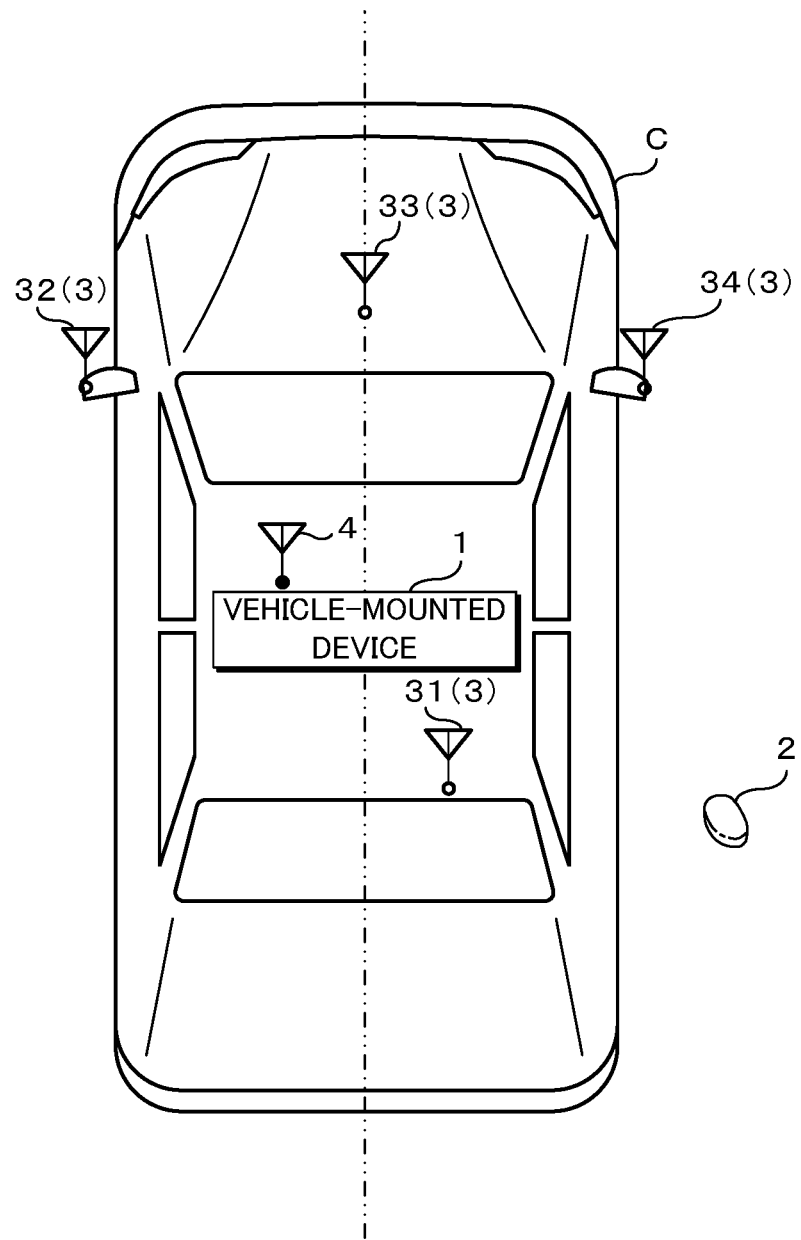
FIG. 1 is a block diagram showing a structure example of the vehicle communication system according to a first embodiment.

Problem to be Solved by the Present Disclosure

Patent Document 1 has a problem in that the intensity of the signal cannot be appropriately set unless the request switch is operated. Specifically, when whether the mobile device is present inside the vehicle cabin or not is determined in the push start system to start the engine, it is impossible to switch the signal intensity.

Moreover, in Patent Document 2, it is conjectured that the mobile device is present in the neighborhood of a side surface of the vehicle by using the transmitting antenna outside the vehicle cabin, and when an erroneous conjecture is made, there is a possibility that the position of the mobile device is erroneously determined. For example, when it is conjectured that the mobile device is absent in the neighborhood of a side surface of the vehicle although the mobile device is situated outside in the neighborhood of the side surface, the threshold value is set to a low value, so that the mobile device present outside the vehicle cabin is erroneously determined to be present inside the vehicle cabin.

An object of the present application is to provide a vehicle communication system and a vehicle-mounted device capable of, in a system in which signals transmitted from a plurality of antennas on the vehicle side are received by a mobile device and the position of the mobile device is determined by using the received signal strengths of the signals measured at the mobile device, accurately determining the position of the mobile device even when the transmitting antenna inside the vehicle cabin is deviated in one direction in the width direction of the vehicle from the central portion in the width direction.

Effects of the Present Disclosure

According to the present disclosure, in a system in which signals transmitted from a plurality of antennas on the vehicle side are received by a mobile device and the position of the mobile device is determined by using the received signal strengths of the signals measured at the mobile device, a vehicle communication system and a vehicle-mounted device can be provided that are capable of accurately determining the position of the mobile device even when the transmitting antenna inside the vehicle cabin is deviated in one direction in the width direction of the vehicle from the central portion in the width direction.

Description of the Embodiments of the Present Disclosure

First, modes of the present disclosure will be listed and described. Moreover, at least some of the embodiments described below may be combined arbitrarily.

(1) A vehicle communication system according to one aspect of the present disclosure comprising: a vehicle-mounted device that transmits signals from a plurality of transmitting antennas provided on a vehicle; and a mobile device that receives the signals transmitted from the vehicle-mounted device and transmits a response signal including received signal strengths of the received signals, in which the vehicle-mounted device receives the response signal transmitted from the mobile device and determines whether the mobile device is present inside a vehicle cabin or not based on the received signal strengths included in the received response signal, wherein the plurality of transmitting antennas include: a first transmitting antenna provided in the vehicle cabin so as to be deviated in one direction in a width direction of the vehicle from a central portion in the width direction; and a second transmitting antenna provided nearer to the other side surface in the width direction of the vehicle, and the vehicle-mounted device is provided with an inside-or-outside-area determination unit that determines whether or not the mobile device is present inside an area containing a vehicle interior space and having a boundary surface following at least one side surface in the width direction of the vehicle, based on the received signal strengths of the signals transmitted from the first transmitting antenna and the second transmitting antenna, respectively.

In the present mode, the vehicle-mounted device transmits signals from the plurality of antennas provided on the vehicle. The signals are signals for determining the position of the mobile device. The mobile device receives the signals transmitted from the antennas, measures the received signal strengths of the signals, and transmits a response signal including the received signal strengths obtained by the measurement to the vehicle-mounted device. The received signal strengths of the signals change according to the position of the mobile device with respect to the vehicle.

The vehicle-mounted device receives the response signal transmitted from the mobile device. The inside-or-outside-area determination unit of the vehicle-mounted device determines whether the mobile device is present inside the area containing the vehicle interior space or not based on the received signal strengths included in the response signal. Hereinafter, the determination by the inside-or-outside-area determination unit will be referred to as inside-or-outside determination. The boundary surface of the area may be defined as a surface where the received signal strengths of the signals transmitted from the plurality of antennas, respectively, satisfy a predetermined condition. Since the area has the boundary surface following at least one side surface in the width direction of the vehicle, it can be accurately determined whether or not the mobile device is present inside the vehicle cabin in the neighborhood of the one side surface in the width direction.

In particular, in the present mode, the first transmitting antenna is deviated in one direction in the width direction of the vehicle from the central portion of the width direction. That is, the first transmitting antenna is provided nearer to the right side or to the left side in the vehicle cabin. For this reason, if an area having a boundary surface following one side surface in the width direction of the vehicle is formed, that is, if a condition to be satisfied by the received signal strengths of the signals received by the mobile device present on the side surface is determined, the other boundary surface in the width direction is concaved, so that the vehicle interior space is not contained. Specifically, when the first transmitting antenna is provided nearer to the right side in the vehicle cabin, if an area having a boundary surface following the right side surface of the vehicle is formed, the left side surface side of the vehicle is concaved so that the vehicle interior space is not contained (see FIG. 7 and FIG. 8). Likewise, when the first transmitting antenna is provided nearer to the left side in the vehicle cabin, if an area having a boundary surface following the left side surface of the vehicle is formed, the right side surface side of the vehicle is concaved so that the vehicle interior space is not contained.

Accordingly, in the present mode, the second transmitting antenna provided nearer to the other side surface in the width direction of the vehicle is used. For example, when the first transmitting antenna is provided nearer to the right side in the vehicle cabin, the second transmitting antenna provided nearer to the left side surface is used. When the first transmitting antenna is provided nearer to the left side in the vehicle cabin, the second transmitting antenna provided nearer to the right side surface is used. When the received signal strengths of the signals transmitted from the first and second transmitting antennas situated as described above are used, an area can be formed that has a boundary surface following one side surface in the width direction of the vehicle and containing the vehicle interior space (see FIG. 4A and FIG. 4B).

While the inside-or-outside determination is performed by using the first and second transmitting antennas in the present mode, the inside-or-outside determination may be performed by using three or more transmitting antennas by also using another transmitting antenna.

Moreover, the final determination as to whether the mobile device is present inside the vehicle cabin or not can be implemented by determining whether the mobile device is present inside the area or not and then, narrowing down the position of the mobile device by further using a different method. For example, by confirming that the mobile device is present in the neighborhood of a side surface of the vehicle that the boundary surface of the area follows by use of another transmitting antenna and determining whether the mobile device is present inside the area or not, whether the mobile device is present inside the vehicle cabin or not can be determined accurately (see the second embodiment). Moreover, by narrowing down the position of the mobile device by further determining whether or not the mobile device is present inside the area containing the vehicle interior space and having a boundary surface following at least the other side surface in the width direction of the vehicle as in the present mode, whether the mobile device is present inside the vehicle cabin or not can be determined accurately (see the first embodiment). Hereinafter, the determination as to whether the mobile device is present inside the vehicle cabin or not will be referred to as inside-or-outside-vehicle-cabin determination.

(2) It is preferable that an addition unit is provided that adds the received signal strength of the signal transmitted from the second transmitting antenna to the received signal strength of the signal transmitted from the first transmitting antenna, and the inside-or-outside-area determination unit determines whether the mobile device is present inside the area or not based on a value obtained by the addition unit.

In the present mode, by adding the received signal strength of the signal transmitted from the second transmitting antenna to the received signal strength of the signal transmitted from the first transmitting antenna, a so-called received signal strength related to the first transmitting antenna is corrected.

When the mobile device is situated on the side of one side surface in the width direction of the vehicle, since the distance between the mobile device and the second transmitting antenna is long, the received signal strength of the signal transmitted from the second transmitting antenna is comparatively low, and the value of the received signal strength added to the received signal strength related to the first transmitting antenna is low. That is, the correction amount is small. Conversely, when the mobile device is situated on the side of the other side surface in the width direction of the vehicle, since the distance between the mobile device and the second transmitting antenna is comparatively short, the received signal strength of the signal transmitted from the second transmitting antenna is comparatively high, and the value of the received signal strength added to the received signal strength related to the first transmitting antenna is high. That is, the correction amount is large. Since the correction amount changes according to the position of the mobile device as described above, by adding the received signal strength related to the second transmitting antenna to the received signal strength related to the first transmitting antenna, the concave of the other side surface in the width direction of the vehicle can be corrected without any distortion of the boundary surface of the area following one side surface in the width direction of the vehicle.

Moreover, the inside-or-outside-area determination unit has a structure of performing the inside-or-outside determination based on the value obtained by performing addition, and is capable of performing the inside-or-outside determination of the mobile device by the simple arithmetic processing.

(3) It is preferable that the addition unit multiplies the received signal strength of the signal transmitted from the second transmitting antenna, by a weight coefficient that is less than one, and adds the weighted received signal strength to the received signal strength of the signal transmitted from the first transmitting antenna.

In the present mode, by performing the weight addition, the inside-or-outside determination can be performed while the area is formed that has a boundary surface following one side surface in the width direction of the vehicle more accurately and contains the vehicle interior space.

(4) It is preferable that the plurality of transmitting antennas include a third transmitting antenna provided in the vehicle cabin, an addition unit is further provided that adds the received signal strength of the signal transmitted from the second transmitting antenna to the received signal strength of the signal transmitted from the first transmitting antenna and to the received signal strength of the signal transmitted from the third transmitting antenna, and the inside-or-outside-area determination unit determines whether two values obtained by the addition unit satisfy a predetermined determination expression or not.

In the present mode, by performing the inside-or-outside determination based on the received signal strengths of the signals transmitted from the first to third transmitting antennas, the inside-or-outside determination of the mobile device can be performed while the area is formed that has a boundary surface following one side surface in the width direction of the vehicle more accurately and contains the vehicle interior space.

Specifically, the vehicle-mounted device adds the received signal strength of the signal transmitted from the second transmitting antenna to the received signal strength of the signal transmitted from the first transmitting antenna and to the received signal strength of the signal transmitted from the third transmitting antenna, and determines whether the two values obtained by the addition satisfy the predetermined determination expression or not.

In a system in which the position of the mobile device is determined simply by a response of the mobile device to the signals transmitted from the first to third transmitting antennas, the area cannot be extended so as to have a boundary surface following a side surface of the vehicle and containing the vehicle interior space. However, according to the structure using the received signal strengths of the signals transmitted from the first to third transmitting antennas as in the present mode, the area can be formed as described above, so that the mobile device can be determined accurately.

(5) It is preferable that the addition unit is provided with: a first weight addition unit that multiplies the received signal strength of the signal transmitted from the second transmitting antenna by a first weight coefficient that is less than one, and adds the weighted received signal strength to the received signal strength of the signal transmitted from the first transmitting antenna, and a second weight addition unit that multiplies the received signal strength of the signal transmitted from the second transmitting antenna by a second weight coefficient that is less than one, and adds the weighted received signal strength to the received signal strength of the signal transmitted from the third transmitting antenna.

In the present mode, as in the mode (3), by performing the weight addition, the inside-or-outside determination can be performed while the area is formed that has a boundary surface following one side surface in the width direction of the vehicle more accurately and contains the vehicle interior space.

(6) It is preferable that the plurality of transmitting antenna include a third transmitting antenna provided in the vehicle cabin, a calculation unit is further provided that calculates a scalar determination value for determining whether the mobile device is present inside the area or not, based on the received signal strengths of the signals transmitted from the first transmitting antenna, the second transmitting antenna and the third transmitting antenna, respectively, and the inside-or-outside-area determination unit compares the determination value calculated by the calculation unit with a predetermined threshold value.

In the present mode, by performing the inside-or-outside determination based on the received signal strengths of the signals transmitted from the first to third transmitting antennas, the inside-or-outside determination can be performed while the area is formed that has a boundary surface following one side surface in the width direction of the vehicle more accurately and contains the vehicle interior space.

Specifically, the vehicle-mounted device calculates the scalar determination value for determining whether the mobile device is inside the area or not based on the received signal strengths of the signals transmitted from the first to third transmitting antennas, respectively. For example, by adding the received signal strengths or performing weight addition, the vehicle-mounted device calculates the scalar determination value. Then, the vehicle-mounted device performs the inside-or-outside determination of the mobile device by comparing the calculated determination value with the predetermined threshold value.

According to the present mode, the inside-or-outside determination of the mobile device can be performed by the simple arithmetic processing of comparing the scalar determination value with the threshold value.

(7) It is preferable that the area contains the whole of the vehicle interior space and part of the outside of the vehicle and having a boundary surface following one side surface in the width direction of the vehicle.

According to the present mode, since the area for performing the inside-or-outside-vehicle-cabin determination of the mobile device contains the whole of the vehicle interior space and part of the outside of the vehicle, the possibility that the mobile device present inside the vehicle cabin is erroneously determined to be present outside the vehicle cabin can be reduced significantly.

On the other hand, since the area has a boundary surface following one side surface in the width direction of the vehicle, whether the mobile device is present inside the vehicle cabin or outside the vehicle cabin can be accurately determined with respect to the boundary surface.

(8) A vehicle-mounted device according to one aspect of the present disclosure that transmits signals from a plurality of transmitting antennas provided on a vehicle to a mobile device and determines whether the mobile device is present inside a vehicle cabin or not based on received signal strengths of the signals received by the mobile device, wherein the plurality of transmitting antennas include: a first transmitting antenna provided in the vehicle cabin so as to be deviated in one direction in a width direction of the vehicle from a central portion in the width direction; and a second transmitting antenna provided nearer to the other side in the width direction of the vehicle, and the vehicle-mounted device is provided with an inside-or-outside-area determination unit that determines whether or not the mobile device is present inside an area containing a vehicle interior space and having a boundary surface following at least one side surface in the width direction of the vehicle, based on the received signal strengths of the signals transmitted from the first transmitting antenna and the second transmitting antenna, respectively.

In the present mode, as in the mode (1), even when the first transmitting antenna in the vehicle cabin is deviated in one direction in the width direction of the vehicle from the central portion in the width direction, the inside-or-outside determination of the mobile device can be accurately performed.

Details of the Embodiments of the Present Disclosure

It is to be noted that, as used herein and in the appended claims, the singular forms "a", "an", and "the" include plural referents unless the context clearly dictates otherwise.

Concrete examples of the vehicle communication system according to the embodiments of the present disclosure will be described below with reference to the drawings. The present disclosure is not limited to these examples but defined by the claims, and all changes that fall within the definition and scope equivalent to the claims are to be embraced.

First Embodiment

FIG. 1 is a block diagram showing a structure example of the vehicle communication system according to the first embodiment. In FIG. 1, the alternate long and two short dashes line indicates the center line in the width direction of a vehicle C. The vehicle communication system according to the first embodiment is provided with: a vehicle-mounted device 1 that transmits and receives various signals by using a plurality of transmitting antennas (3) and a receiving antenna 4 provided on the vehicle C; and a mobile device 2 that transmits and receives signals to and from the vehicle-mounted device 1.

The plurality of transmitting antennas (3) include, for example: a first transmitting antenna 31 provided so as to be deviated rightward from the central portion in the width direction of the vehicle C in a rear part of the vehicle C; a second transmitting antenna 32 provided on the door mirror on the front passenger seat side; a third transmitting antenna 33 provided on the central portion in the width direction of the vehicle C in a front part of the vehicle C; and a fourth transmitting antenna 34 provided on the door mirror on the driver seat side. The receiving antenna 4 is provided in an appropriate position of the vehicle C. As described above, the first transmitting antenna 31 is provided in the vehicle cabin so as to be deviated in one direction in the width direction of the vehicle C from the central portion in the width direction, and the second transmitting antenna 32 is provided nearer to the other side surface in the width direction of the vehicle C. In the first embodiment, the right side in the travel direction of the vehicle C is the driver seat side, whereas the left side in the travel direction is the front passenger seat.

The vehicle-mounted device 1 successively transmits signals for determining the position of the mobile device 2 from the plurality of transmitting antennas (3) by using radio signals. The mobile device 2 receives the signals transmitted from the transmitting antennas (3), and measures the received signal strengths of the received signals. The mobile device 2 transmits a response signal including the measured received signal strengths to the vehicle-mounted device 1 by using a radio signal. The vehicle-mounted device 1 receives the response signal transmitted from the mobile device 2, performs the inside-or-outside-vehicle-cabin determination of the mobile device 2 based on the received signal strengths included in the received response signal, and executes the predetermined processing according to the determination result. For example, the vehicle-mounted device 1 executes a processing such as engine starting, or locking or unlocking of a vehicle door.

Figure 2:
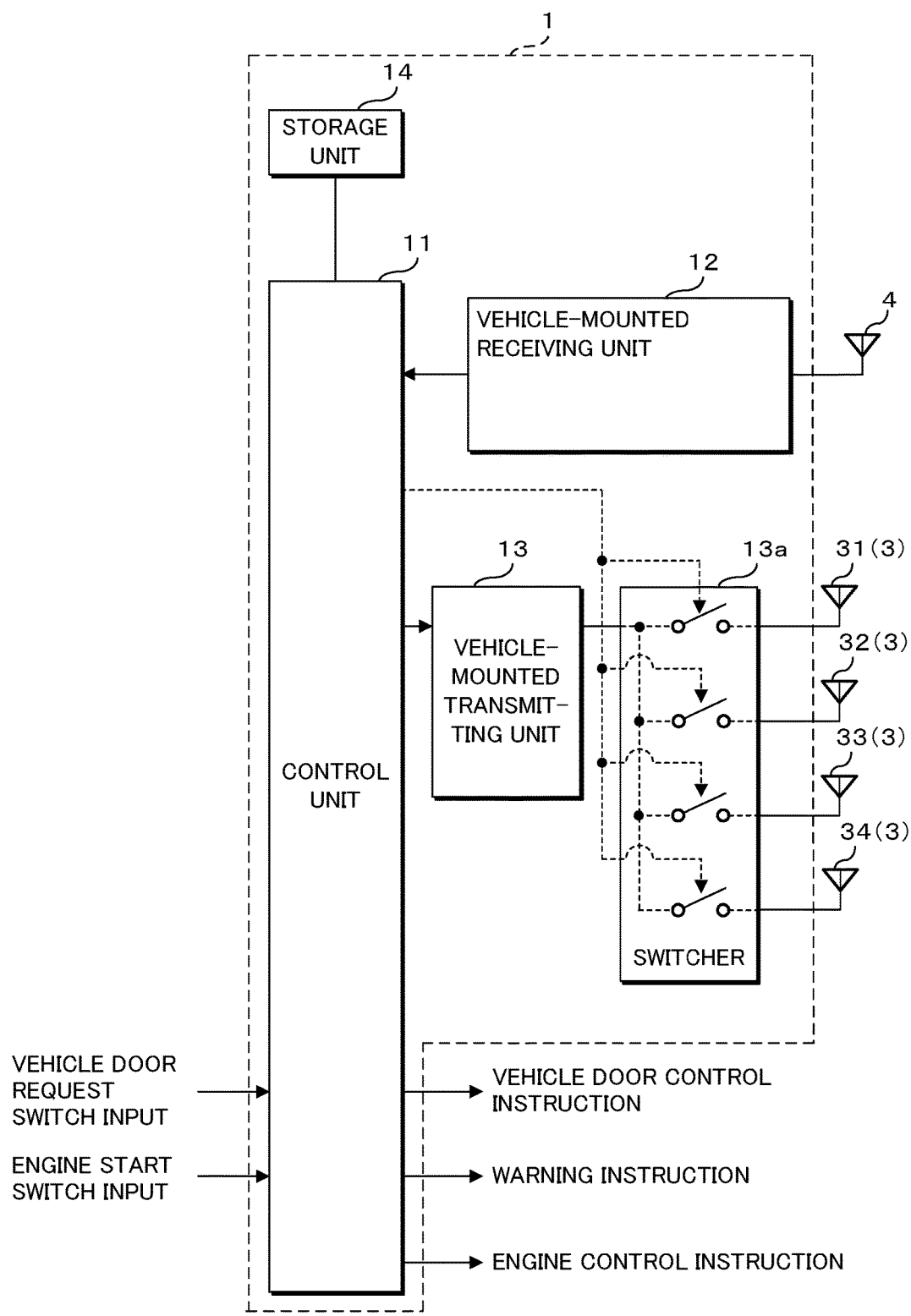
FIG. 2 is a block diagram showing a structure example of the vehicle-mounted device.

FIG. 2 is a block diagram showing a structure example of the vehicle-mounted device 1. The vehicle-mounted device 1 is provided with a control unit 11 that controls the operations of the structural portions of the vehicle-mounted device 1. The control unit 11 is provided with a vehicle-mounted receiving unit 12, a vehicle-mounted transmitting unit 13, a switcher 13a and a storage unit 14.

The control unit 11 is, for example, a microcomputer having one or more than one CPU (central processing unit), a multicore CPU, a ROM (read only memory), a RAM (random access memory), an input-output interface, a timer and the like. The CPU of the control unit 11 is connected to the vehicle-mounted receiving unit 12, the vehicle-mounted transmitting unit 13 and the storage unit 14 through the input-output interface. The control unit 11 executes later-described computer programs stored in the storage unit 14, thereby controlling the operations of the structural portions and executing the inside-or-outside-vehicle-cabin determination of the mobile device 2 and the predetermined processing according to the inside-or-outside-vehicle-cabin determination.

The storage unit 14 is a nonvolatile memory such as an EEPROM (electrically erasable programmable ROM) or a flash memory. The storage unit 14 stores the computer program for the control unit 11 to execute the inside-or-outside-vehicle-cabin determination of the mobile device 2 by controlling the operations of the structural portions of the vehicle-mounted device 1. Moreover, the storage unit 14 stores various determination expressions for performing the inside-or-outside-vehicle-cabin determination of the mobile device 2. Details of the determination expressions will be described later. While the control unit 11 and the storage unit 14 are shown as separate structural portions in FIG. 2, the storage unit 14 may be provided inside the control unit 11.

To the vehicle-mounted receiving unit 12, the receiving antenna 4 is connected. The vehicle-mounted receiving unit 12 receives a response signal and the like transmitted from the mobile device 2 by radio, through the receiving antenna 4. The vehicle-mounted receiving unit 12 is a circuit that removes the carrier wave component from the received response signal and the like to extract the reception signal and outputs the extracted reception signal to the control unit 11. While a UHF (ultra high frequency) band of 300 MHz to 3 GHz is used as the carrier wave, the carrier wave is not limited to this frequency band.

The vehicle-mounted transmitting unit 13 is a circuit that modulates the signal outputted from the control unit 11 into a radio signal by using the carrier wave and transmits the radio signal to the mobile device 2 from one transmitting antenna (3) selected by the control unit 11 and the switcher 13a. While an LF (low frequency) band of 30 kHz to 300 kHz is used as the carrier wave, the carrier wave is not limited to this frequency band.

Moreover, to the control unit 11 of the vehicle-mounted device 1, a request signal responsive to the operation condition of a non-illustrated vehicle door request switch is inputted. The control unit 11 is capable of recognizing the operation condition of the vehicle door request switch based on the inputted request signal. The vehicle door request switch is, for example, a switch for locking or unlocking the vehicle door on the driver seat side or on the front passenger seat side, and is provided on the door handle outside the driver seat or outside the front passenger seat. Instead of a push button, a contact sensor that detects contact of the user's hand with the door handle may be provided. Moreover, the control unit 11 may directly obtain the request signal responsive to the operation of the vehicle door request switch or may obtain it through a door ECU (electronic control unit), another kind of ECU or the like.

The control unit 11 outputs, to the non-illustrated door ECU, a vehicle door control instruction to control the unlocking or the locking of the vehicle door according to a situation such as the operation condition of the vehicle door request switch or whether the mobile device 2 is present inside the vehicle cabin or not. The door ECU locks or unlocks the vehicle door according to the vehicle door control instruction from the control unit 11. Moreover, the control unit 11 outputs a warning instruction to a non-illustrated warning device if necessary according to the above-mentioned situation. For example, when the vehicle door request switch is operated with the mobile device 2 being inside the vehicle cabin, the control unit 11 outputs the warning instruction to the warning device. The warning device provides the user of the vehicle C with a predetermined warning by using sound, light or the like according to the warning instruction.

Further, to the control unit 11 of the vehicle-mounted device 1, an engine start signal responsive to the operation condition of a non-illustrated engine start switch is inputted. The control unit 11 is capable of recognizing the operation condition of the engine start switch based on the inputted engine start signal. The control unit 11 outputs, to a non-illustrated engine ECU, an engine control instruction to start or stop the engine according to a situation such as the operation condition of the engine start switch or whether the mobile device 2 is present inside the vehicle cabin or not. The engine ECU starts or stops the engine according to the engine control instruction from the control unit 11.

Figure 3:
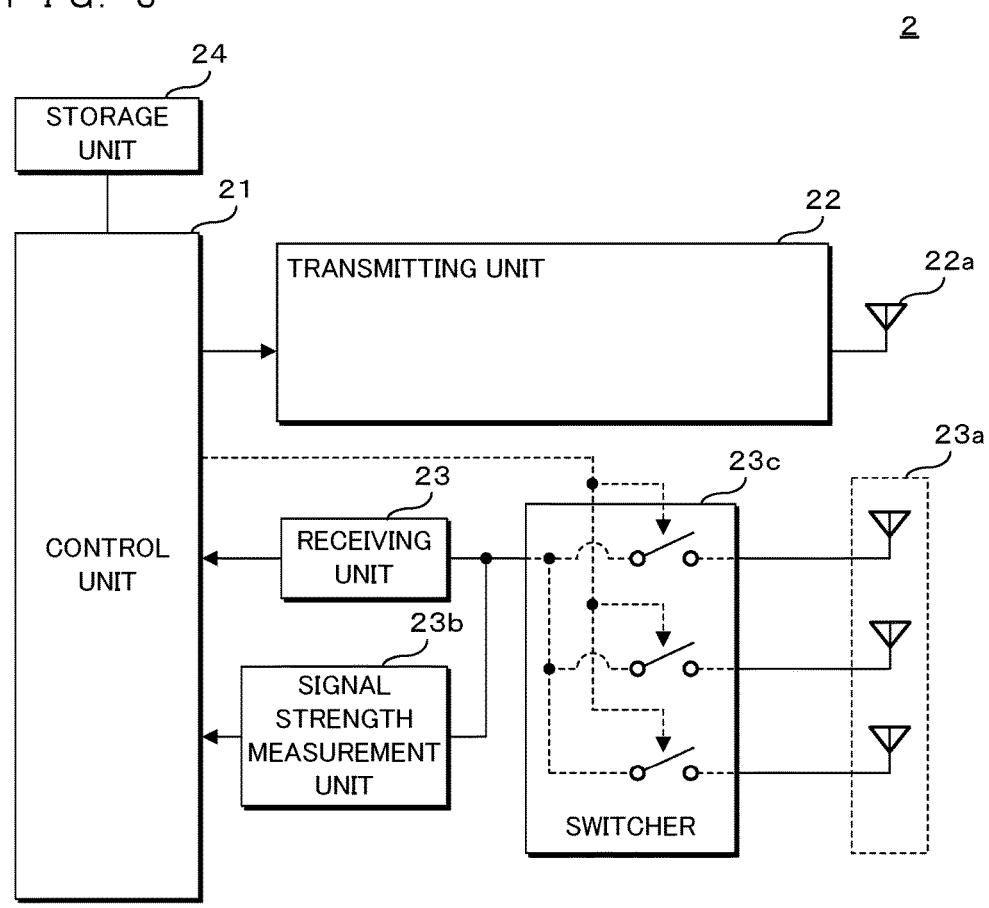
FIG. 3 is a block diagram showing a structure example of the mobile device.

FIG. 3 is a block diagram showing a structure example of the mobile device 2. The mobile device 2 is provided with a control unit 21 that controls the operations of the structural portions of the mobile device 2. The control unit 21 is provided with a transmitting unit 22, a receiving unit 23, a signal strength measurement unit 23b, a switcher 23c and a storage unit 24.

The control unit 21 is, for example, a microcomputer having one or more than one CPU, a multicore CPU, a ROM, a RAM, an input-output interface, a timer and the like. The CPU of the control unit 21 is connected to the transmitting unit 22, the receiving unit 23 and the signal strength measurement unit 23b through the input-output interface. The control unit 21 executes a control program stored in the storage unit 24, thereby controlling the operations of the structural portions and executing various processings to transmit, to the vehicle-mounted device 1, information necessary for the inside-or-outside-vehicle-cabin determination of the mobile device 2.

The storage unit 24 is a nonvolatile memory similar to the storage unit 14. The storage unit 24 stores the control program for the control unit 21 to perform the inside-or-outside-vehicle-cabin determination of the mobile device 2 by controlling the operations of the structural portions of the mobile device 2. By the control program, the control unit 21 executes the processing to transmit, to the vehicle-mounted device 1, a response signal and the like including information necessary for the inside-or-outside-vehicle-cabin determination. Moreover, the storage unit 24 stores a mobile device identifier for identifying the mobile device 2. While the control unit 21 and the storage unit 24 are shown as separate structural portions in FIG. 3, the storage unit 24 may be provided inside the control unit 21.

To the receiving unit 23, a three-axis antenna 23a where three coils are disposed in directions orthogonal to one another is connected through the switcher 23c. The receiving unit 23 receives the radio signal transmitted from the vehicle-mounted device 1, through the three-axis antenna 23a and the switcher 23c. The three radio signals received by the three-axis antenna 23a are inputted to the switcher 23c. The switcher 23c selects one radio signal according to the control by the control unit 21. The receiving unit 23 is a circuit that removes the carrier wave component from the radio signal selected by the switcher 23c to extract the reception signal and outputs the extracted reception signal to the control unit 21. While an LF band of 30 kHz to 300 kHz is used as the carrier wave, the carrier wave is not limited to this frequency band.

Moreover, the mobile device 2 is provided with the signal strength measurement unit 23b that receives the radio signal transmitted from the vehicle-mounted device 1 through the three-axis antenna 23a, measures the received signal strength of the radio signal selected by the switcher 23c and outputs the measured received signal strength to the control unit 21.

The control unit 21 selects the three radio signals from the three-axis antenna 23a in accordance with the timing of transmission of the radio signal for signal strength measurement from the vehicle-mounted device 1, and measures the received signal strengths of the selected radio signals by the signal strength measurement unit 23b. That is, the control unit 21 measures not the received signal strength in the direction of amplitude of the radio signal transmitted from the vehicle-mounted device 1 but the components of the received signal strengths in three orthogonal directions of the three-axis antenna 23a. The control unit 21 performs a vector calculation from the measured components of the received signal strengths to calculate the received signal strength in the direction of amplitude of the radio signal transmitted from the vehicle-mounted device 1. Consequently, the control unit 21 can obtain a constant received signal strength irrespective of the direction or the position of the mobile device 2 with respect to the vehicle C. In the following, the received signal strength calculated by the vector calculation will be called received signal strength unless otherwise specified.

While an example in which the control unit 21 calculates the received signal strength is described here, the received signal strengths of the signals received through the three-axis antenna 23a may be transmitted from the mobile device 2 to the vehicle-mounted device 1 so that the control unit 11 of the vehicle-mounted device 1 calculates the received signal strength.

The transmitting unit 22 is a circuit that modulates the response signal and the like inputted by the control unit 21 by using a carrier wave and transmits a radio signal through a transmitting antenna 22a. While a UHF band of 300 MHz to 3 GHz is used as the carrier wave, the carrier wave is not limited to this frequency band.

Next, the determination expressions stored in the storage unit 14 of the vehicle-mounted device 1 will be described. The storage unit 14 stores determination expressions that define a plurality of different areas containing the vehicle interior space. In the first embodiment, the storage unit 14 stores, as two areas, determination expressions for determining whether the mobile device 2 is present inside a first area 61 and a second area 62 or not.

Figure 4A:
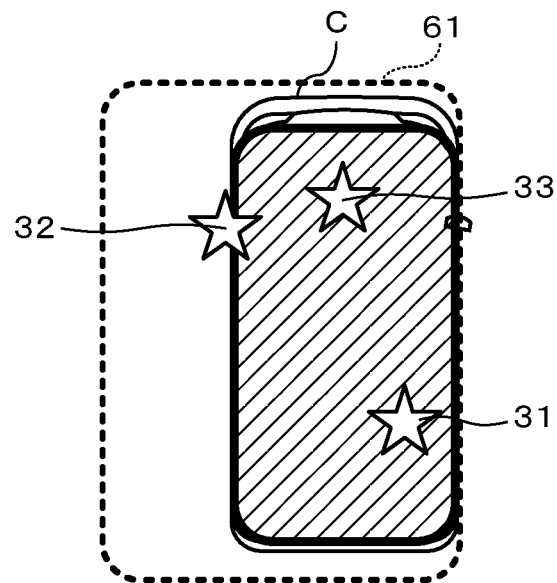
FIG. 4A is a conceptual view showing a first region.
Figure 4B:
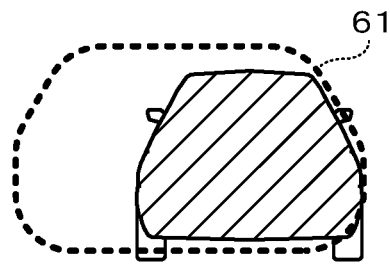
FIG. 4B is a conceptual view showing the first region.

FIG. 4A and FIG. 4B are conceptual views showing the first area 61. FIG. 4A is a plan view of the first area 61, and FIG. 4B is an elevation view of the first area 61. The first area 61 is a three-dimensional space, and as shown in FIG. 4A and FIG. 4B, has a shape having a boundary surface following the right side surface of the vehicle C and containing the vehicle interior space. Therefore, the left side wall constituting the vehicle cabin is also contained in the first area 61. The first area 61 preferably contains the whole of the vehicle interior space and part of the outside of the vehicle cabin. In FIG. 4A and FIG. 4B, the hatched part is the vehicle interior space. The vehicle interior space is, for example, a space where the mobile device 2 can be disposed by the user staying in the vehicle cabin.

Since the boundary surface of the first area 61 and the inside surface of the vehicle cabin do not completely coincide with each other, even if the inside-or-outside determination of the mobile device 2 in the first area 61 is performed, the inside-or-outside-vehicle-cabin determination of the mobile device 2 cannot be performed accurately. However, since at least part of the boundary surface of the first area 61 substantially coincides with the right inside surface of the vehicle cabin, the inside-or-outside-vehicle-cabin determination of the mobile device 2 can be accurately performed only in the case where the mobile device 2 is present in the neighborhood of the right side surface of the vehicle C.

Such a first area 61 can be defined as an area where the received signal strengths of the signals transmitted from the first transmitting antenna 31, the second transmitting antenna 32 and the third transmitting antenna 33, respectively, satisfy a predetermined condition as shown by the stars in FIG. 4A. Specifically, the first area 61 is an area where two values (X1, Y1) expressed by the following expressions (1) and (2) satisfy predetermined determination expressions. The determination expressions are expressed, for example, as quadratic polynomials of X1 and Y1.

$$X1 = RSSI\_1 + RSSI\_2 \times k1 \tag{1}$$

$$Y1 = RSSI\_3 + RSSI\_2 \times k2 \tag{2}$$

Here,

RSSI_1 is the received signal strength of the signal transmitted from the first transmitting antenna 31, RSSI_2 is the received signal strength of the signal transmitted from the second transmitting antenna 32, RSSI_3 is the received signal strength of the signal transmitted from the third transmitting antenna 33, k1 is a predetermined first weight coefficient, and k2 is a predetermined second weight coefficient.

The determination expressions defining the first area 61 are calculated in the process of manufacturing the vehicle communication system, and the storage unit 14 stores the calculated determination expressions. The various coefficients constituting the determination expressions of the first area 61 are calculated based on sampled values X1 and Y1 obtained by disposing the mobile device 2 in a plurality of positions inside and outside the right side surface of the vehicle C and measuring the response signal intensities. The device that measures the sampled values of the received signal strengths is not necessarily the mobile device 2, and is not specifically limited as long as it is a measurement device capable of measuring signal intensities corresponding to the received signal strengths measured by the mobile device 2.

Like the determination expressions, the weight coefficients k1 and k2 are determined in the manufacturing process in which the determination expressions for the first area 61 are created, and the storage unit 14 prestores the determined weight coefficients k1 and k2. When the third transmitting antenna 33 is provided substantially in the central portion in the width direction of the vehicle C, it is preferable that the weight coefficient k2 be lower than the weight coefficient k1. This is because since the third transmitting antenna 33 is provided substantially in the central portion in the width direction of the vehicle C, the correction amount of the received signal strength related to the third transmitting antenna 33 may be comparatively low.

Figure 5A:
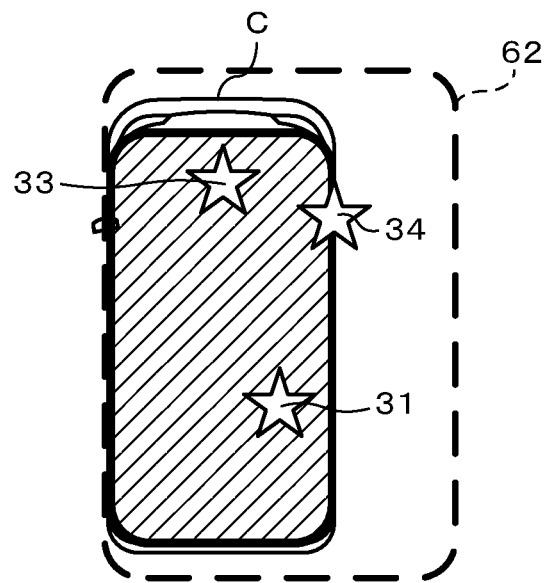
FIG. 5A is a conceptual view showing a second region.
Figure 5B:
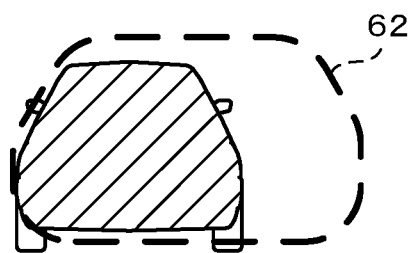
FIG. 5B is a conceptual view showing the second region.

FIG. 5A and FIG. 5B are conceptual views showing the second area 62. FIG. 5A is a plan view of the second area 62, and FIG. 5B is an elevation view of the second area 62. The second area 62 is a three-dimensional space, and as shown in FIG. 5A and FIG. 5B, has a shape having a boundary surface following the left side surface of the vehicle C and containing the vehicle interior space. Therefore, the right side wall constituting the vehicle cabin is also contained in the second area 62. The second area 62 preferably contains the whole of the vehicle interior space and part of the outside of the vehicle cabin. In FIG. 5A and FIG. 5B, the hatched part is the vehicle interior space.

The second area 62 can be defined as an area where the received signal strengths of the signals transmitted from the first transmitting antenna 31, the third transmitting antenna 33 and the fourth transmitting antenna 34 satisfy a predetermined condition as shown by the stars in FIG. 5A. Specifically, the second area 62 is a surface where two values (X2, Y2) expressed by the following expressions (3) and (4) satisfy predetermined determination expressions. The determination expressions are expressed, for example, as quadratic polynomials of X2 and Y2.

$$X2 = RSSI\_1 + RSSI\_4 \times k3 \qquad (3)$$

$$Y2 = RSSI\_3 + RSSI\_4 \times k4 \qquad (4)$$

Here,

RSSI_1 is the received signal strength of the signal transmitted from the first transmitting antenna 31, RSSI_3 is the received signal strength of the signal transmitted from the third transmitting antenna 33, RSSI_4 is the received signal strength of the signal transmitted from the fourth transmitting antenna 34, k3 is a predetermined third weight coefficient, and k4 is a predetermined fourth weight coefficient.

Like the first area 61, the determination expressions and the weight coefficients k3 and k4 for the second area 62 are determined in the manufacturing process in which the determination expressions for the first area 61 are created, and the storage unit 14 stores the calculated determination expressions and weight coefficients k3 and k4. The various coefficients constituting the determination expressions of the second area 62 are calculated based on sampled values X2 and Y2 obtained by disposing the mobile device 2 in a plurality of positions inside and outside the left side surface of the vehicle C and measuring the response signal intensities.

Figure 6:
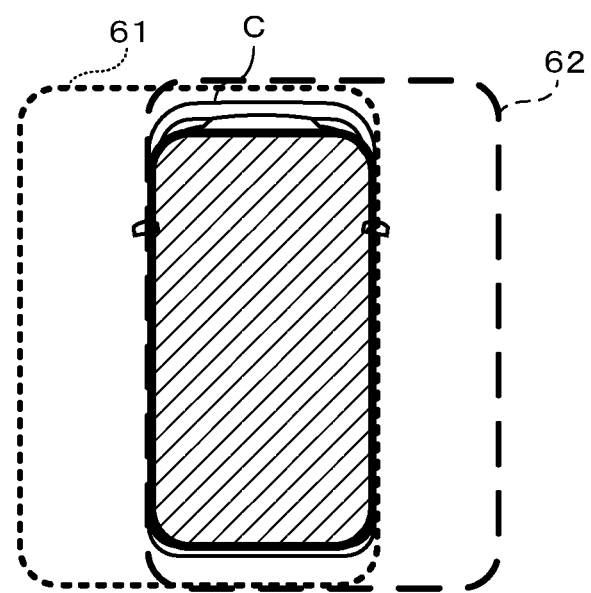
FIG. 6 is a conceptual view showing an area corresponding to the vehicle interior space.

FIG. 6 is a conceptual view showing an area corresponding to the vehicle interior space. In FIG. 6, the range shown by hatching is the area corresponding to the vehicle interior space. Since the first area 61 and the second area 62 contain the vehicle interior space and the boundary surfaces of the first area 61 and the second area 62 follow the right side surface and the left side surface of the vehicle C, respectively, the space present inside all the first area 61 and the second area 62 substantially coincides with the vehicle interior space.

Now, a reason will be described why not only the received signal strengths of the signals transmitted from the first and third transmitting antennas 31 and 33 in the vehicle cabin, respectively, but also the received signal strength of the signal transmitted from the second transmitting antenna 32 outside the vehicle cabin is used when whether the mobile device 2 is present inside the first area 61 or not is determined.

Figure 8:
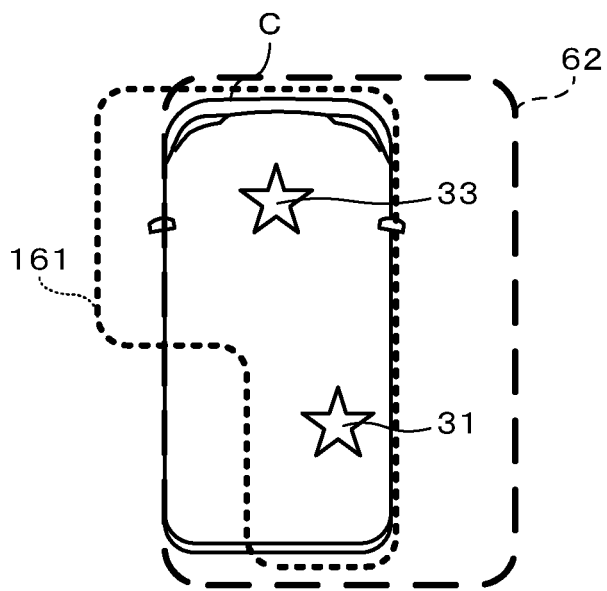
FIG. 8 is a conceptual view showing a concaved vehicle interior space.

FIG. 7 is a conceptual view showing a first area 161 when only the signals of the first and third transmitting antennas 31 and 33 are used, and FIG. 8 is a conceptual view showing a concaved vehicle interior space. If the first area 161 having a boundary surface following the right side surface of the vehicle C is defined by using the received signal strengths of the signals transmitted from the first and third transmitting antennas 31 and 33, as shown in FIG. 7, the left rear part of the vehicle C is concaved, so that the vehicle interior space cannot be contained. If the boundary surface of the first area 161 is defined so as to contain the vehicle interior space, the right side boundary surface of the first area 161 is warped, so that the boundary surface following the right inside surface of the vehicle C cannot be formed.

If the left rear part of the first area 161 is concaved and the vehicle interior space cannot be contained, as shown in FIG. 8, the areas present inside the first area 161 and the second area 62, respectively, are also warped, so that the inside-or-outside-vehicle-cabin determination of the mobile device 2 cannot be performed.

Accordingly, in the first embodiment, the first area 61 as shown in FIG. 4A and FIG. 4B is formed by also using the received signal strength of the second transmitting antenna 32 provided on the door mirror on the front passenger seat side (left side) of the vehicle C.

Figure 9:
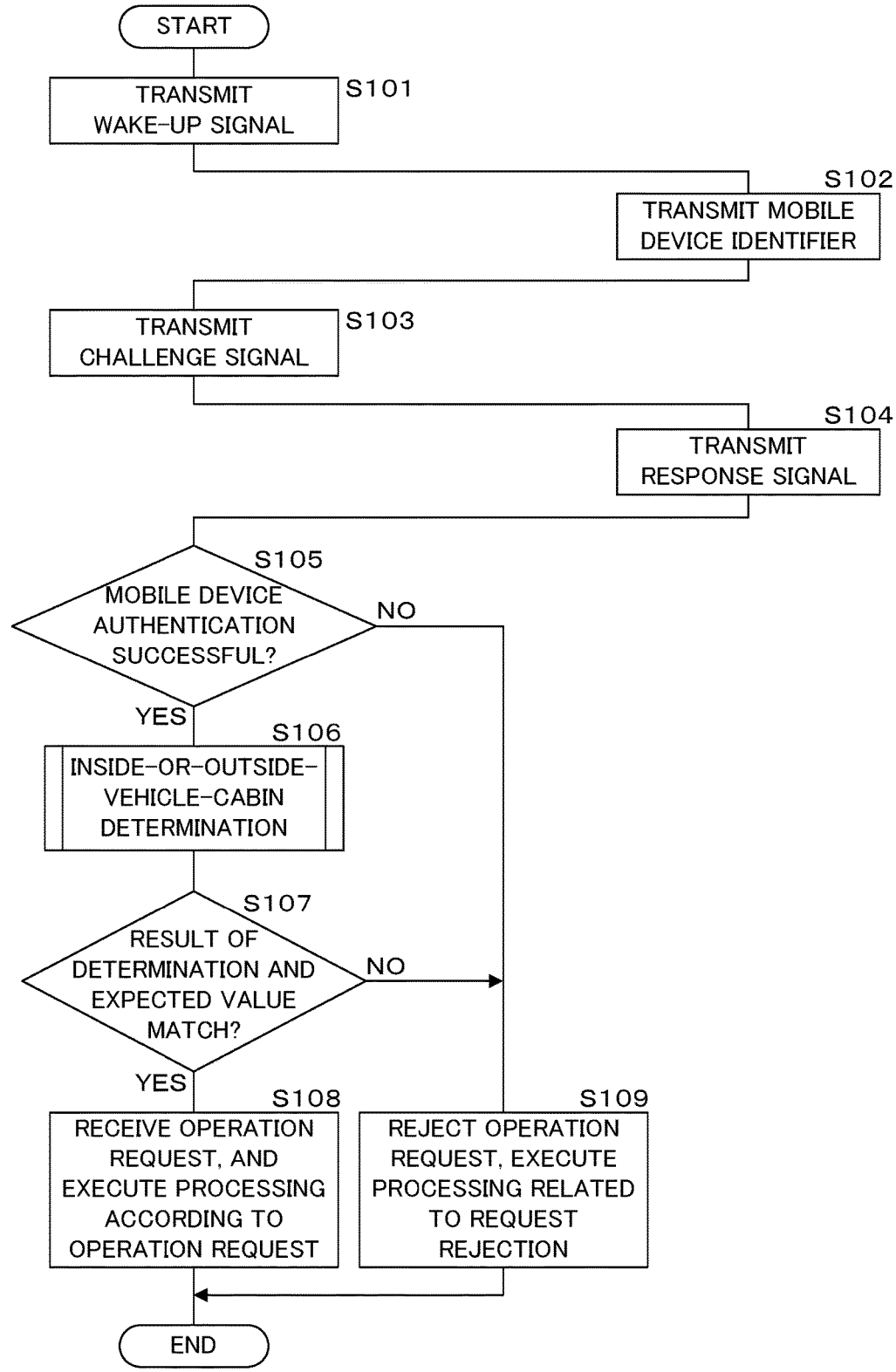
FIG. 9 is a flowchart showing a procedure of the processing on an operation request.

FIG. 9 is a flowchart showing a procedure of the processing on an operation request. When an operation request is provided externally, the vehicle-mounted device 1 and the mobile device 2 execute the following processing. The operation request is, for example, a request to start or stop the engine by an operation of the engine start switch or a request to lock or unlock a vehicle door by an operation of the vehicle door request switch. For example, when a request signal responsive to an operation of the vehicle door request switch is inputted to the vehicle-mounted device 1, when an engine start signal responsive to an operation of the engine start switch is inputted to the vehicle-mounted device 1, the vehicle-mounted device 1 starts the processing.

The control unit 11 of the vehicle-mounted device 1 causes the vehicle-mounted transmitting unit 13 to transmit a wake-up signal from the transmitting antenna (3) (step S101).

The control unit 21 of the mobile device 2 having received the wake-up signal by the receiving unit 23 is activated from sleep state to active state, and transmits its own mobile device identifier to the vehicle-mounted device 1 by the transmitting unit 22 (step S102).

The control unit 11 of the vehicle-mounted device 1 receives the mobile device identifier transmitted from the mobile device 2, by the vehicle-mounted receiving unit 12. Then, the control unit 11 creates data for authentication by using the received mobile device identifier, and causes the vehicle-mounted transmitting unit 13 to transmit a challenge signal including the data from the transmitting antenna (3) (step S103).

The control unit 21 receives the challenge signal by the receiving unit 23, confirms the validity of the vehicle-mounted device 1 by using the data included in the received challenge signal, creates data for the vehicle-mounted device 1 to authenticate the mobile device 2 when the vehicle-mounted device 1 is confirmed to be valid, and transmits a response signal including the data to the vehicle-mounted device 1 by the transmitting unit 22 (step S104).

The control unit 11 of the vehicle-mounted device 1 receives the response signal transmitted from the mobile device 2, by the vehicle-mounted receiving unit 12, and authenticates the mobile device 2 by using the data included in the received response signal (step S105). When it is determined that the authentication is successful (step S105: YES), the control unit 11 executes a subroutine of the processing of the inside-or-outside-vehicle-cabin determination of the mobile device 2 (step S106). That is, the control unit 11 determines whether the mobile device 2 is present inside the vehicle cabin or present outside the vehicle cabin. The result of the inside-or-outside-vehicle-cabin determination is expressed as a numerical value. For example, when the mobile device 2 is present inside the vehicle cabin, the numerical value of the inside-or-outside-vehicle-cabin determination result is 1, and when the mobile device 2 is present outside the vehicle cabin, the numerical value of the inside-or-outside-vehicle-cabin determination result is 0.

Then, the control unit 11 determines whether the result of the inside-or-outside-vehicle-cabin determination and an expected value predetermined according to the contents of the operation request match with each other or not (step S107). For example, the expected value for the engine start operation is 1, and the expected value for the operation to unlock the vehicle door by an operation of the vehicle door request switch is 0.

When it is determined that the result of the inside-or-outside-vehicle-cabin determination and the expected value match with each other (step S107: YES), the control unit 11 receives an operation request, and executes the processing according to the operation request (step S108). For example, when the engine start switch is operated, the processing to output, to the engine ECU, an engine control instruction to start or stop the engine is executed. Moreover, when the vehicle door request switch is operated, the processing to output, to the door ECU, a vehicle door control signal to specify the locking or unlocking of the vehicle door is executed.

When it is determined that the result of the inside-or-outside-vehicle-cabin determination and the expected value do not match with each other (step S107: NO) or when it is determined that the authentication of the mobile device 2 is unsuccessful (step S105: NO), the control unit 11 rejects the operation request, executes the processing related to the request rejection (step S109), and ends the processing. The processing related to the request rejection is, for example, a processing such as emitting a warning sound in a case where the mobile device 2 is absent inside the vehicle cabin when the engine start switch is operated. The processing related to the request rejection is not essential.

Figure 10:
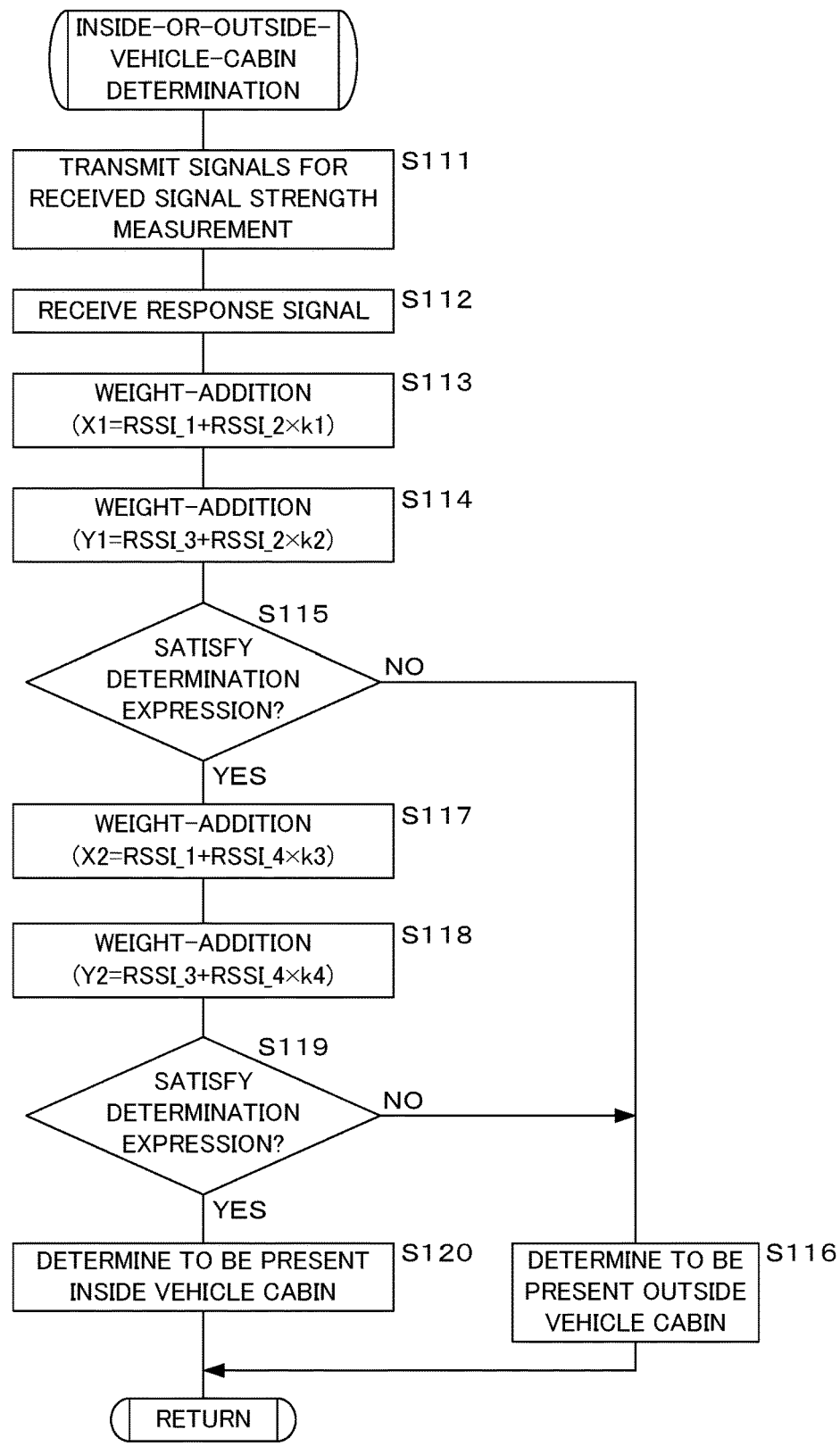
FIG. 10 is a flowchart showing a processing procedure of an inside-or-outside-vehicle-cabin determination subroutine in the first embodiment.
Figure 11A:
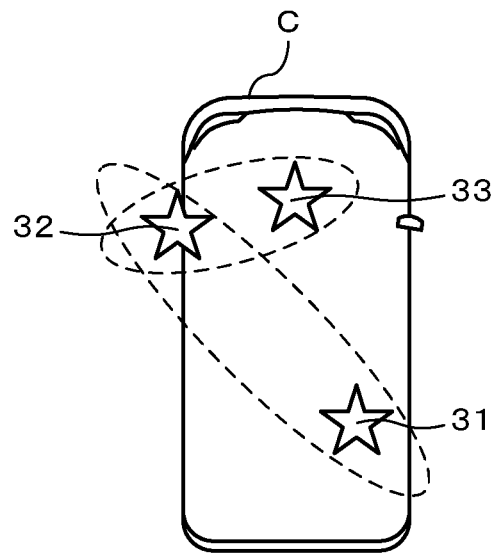
FIG. 11A is a conceptual view showing a weight addition method in the first embodiment.
Figure 11B:
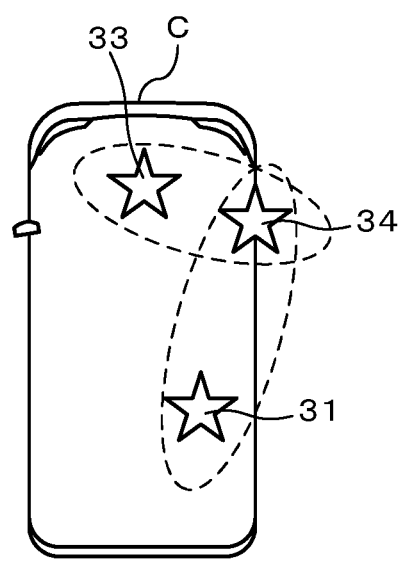
FIG. 11B is a conceptual view showing the weight addition method in the first embodiment.

FIG. 10 is a flowchart showing a processing procedure of the inside-or-outside-vehicle-cabin determination subroutine in the first embodiment, and FIG. 11A and FIG. 11B are conceptual views showing a weight addition method in the first embodiment. In particular, FIG. 10 shows a processing procedure suitable for the inside-or-outside-vehicle-cabin determination when the engine start switch is operated. The control unit 11 of the vehicle-mounted device 1 causes the vehicle-mounted transmitting unit 13 to successively transmit signals for received signal strength measurement for the inside-or-outside-vehicle-cabin determination from the plurality of transmitting antennas (3) (step S111).

The control unit 21 of the mobile device 2 receives the signals transmitted from the transmitting antennas (3) by the receiving unit 23, and obtains the received signal strengths of the signals measured by the signal strength measurement unit 23b. Then, the control unit 21 transmits, to the vehicle-mounted device 1, a response signal including the measured received signal strengths by the transmitting unit 22.

The control unit 11 of the vehicle-mounted device 1 receives the response signal transmitted from the mobile device 2, by the vehicle-mounted receiving unit 12 (step S112). Then, the control unit 11 adds a weight to, of the received signal strengths included in the response signal received by the vehicle-mounted receiving unit 12, the received signal strength of the signal transmitted from the first transmitting antenna 31 by the received signal strength of the signal transmitted from the second transmitting antenna 32, particularly, as shown by the stars in FIG. 11A (step S113). In FIG. 11A, the two stars surrounded by the broken line ellipses indicate the transmitting antennas (3) which are sources of the signals to be added. Moreover, the control unit 11 adds a weight to the received signal strength of the signal transmitted from the third transmitting antenna 33 by the received signal strength of the signal transmitted from the second transmitting antenna 32 as shown by the stars in FIG. 11A (step S114). The two values X1 and Y1 obtained by the weight addition performed at step S113 and step S114 are expressed by the above expressions (1) and (2).

Then, the control unit 11 reads the determination expressions for the first area 61 from the storage unit 14, and determines whether the values X1 and Y1 weight-added at step S113 and S114 satisfy the determination expressions or not (step S115). When determining that they do not satisfy the determination expressions related to the first area 61 (step S115: NO), the control unit 11 determines that the mobile device 2 is present outside the vehicle cabin (step S116) and ends the processing.

When determining that they satisfy the determination expressions related to the first area 61 (step S115: YES), the control unit 11 adds a weight to, of the received signal strengths included in the response signal received by the vehicle-mounted receiving unit 12, the received signal strength of the signal transmitted from the first transmitting antenna 31 by the received signal strength of the signal transmitted from the fourth transmitting antenna 34, particularly, as shown in FIG. 11B (step S117). Moreover, the control unit 11 adds the weight to the received signal strength of the signal transmitted from the third transmitting antenna 33 by the received signal strength of the signal transmitted from the fourth transmitting antenna 34 as shown in FIG. 11B (step S118). The two values X2 and Y2 obtained by the weight addition performed at step S117 and step S118 are expressed by the above expressions (3) and (4).

Then, the control unit 11 reads the determination expressions for the second area 62 from the storage unit 14, and determines whether the values X2 and Y2 weight-added at step S117 and S118 satisfy the determination expressions or not (step S119). When determining that they do not satisfy the determination expressions related to the second area 62 (step S119: NO), the control unit 11 determines that the mobile device 2 is present outside the vehicle cabin (step S116) and ends the processing. When determining that they satisfy the determination expressions related to the second area 62 (step S119: YES), the control unit 11 determines that the mobile device 2 is present inside the mobile device 2 (step S120) and ends the processing.

As described above, according to the vehicle communication system and the vehicle-mounted device 1 according to the first embodiment, even when the first transmitting antenna 31 in the vehicle cabin is deviated rightward in the width direction of the vehicle C, the position of the mobile device 2 can be determined accurately.

Specifically, by adding a weight to the received signal strengths related to the first and third antennas 31 and 33 by the received signal strength related to the second transmitting antenna 32, as shown in FIG. 4A and FIG. 4B, it can be determined whether or not the mobile device 2 is present inside the first area 61 having a boundary surface following the right side surface of the vehicle C and containing the vehicle interior space. That is, whether the mobile device 2 is present inside the vehicle cabin on the right side surface of the vehicle C or not can be determined accurately.

Likewise, by adding a weight to the received signal strengths related to the first and third transmitting antennas 31 and 33 by the received signal strength related to the fourth transmitting antenna 34, as shown in FIG. 5A and FIG. 5B, it can be determined whether or not the mobile device 2 is present inside the second area 62 having a boundary surface following the left side surface of the vehicle C and containing the vehicle interior space. That is, whether the mobile device 2 is present inside the vehicle cabin on the left side surface of the vehicle C or not can be determined accurately.

Then, by determining whether the mobile device 2 is present inside both the first area 61 and the second area 62 or not, whether the mobile device 2 is present inside the vehicle interior space as shown in FIG. 6 or not can be determined accurately.

In particular, according to the first embodiment, even if there is no auxiliary input such as an operation of the vehicle door request switch, the position of the mobile device 2 can be determined accurately. For example, in the push start system to start the engine, when the engine start switch is operated, the engine can be started or stopped while whether the mobile device 2 is present inside the vehicle cabin or not is determined accurately.

Moreover, by the simple arithmetic processing to add the received signal strength of the signal transmitted from the second transmitting antenna 32 to the received signal strengths of the signals transmitted from the first transmitting antenna 31 and the third transmitting antenna 33, the position of the mobile device 2 can be determined while the concave of the first area 61 is corrected.

Further, by adding a weight to the received signal strengths of the signals transmitted from the first transmitting antenna 31 and the third transmitting antenna 33 by the received signal strength of the signal transmitted from the second transmitting antenna 32, the position of the mobile device 2 can be determined while the first area 61 having a boundary surface following one side surface in the width direction of the vehicle C and containing the vehicle interior space is formed more accurately.

Furthermore, since the vehicle communication system according to the first embodiment has a structure in which it is determined whether or not the values X1 and Y1 weight-added at step S113 and step S114 satisfy the determination expressions, the inside-or-outside-vehicle-cabin determination is enabled that uses the first area 61 or the second area 62 containing the whole of the vehicle interior space and part of the outside of the vehicle cabin and having a boundary surface following the right side surface and the left side surface of the vehicle C. In other words, the first area 61 and the second area 62 can be extended in order that the mobile device 2 present inside the vehicle cabin is not erroneously determined to be present outside the vehicle cabin, so that whether the mobile device 2 is present inside the vehicle cabin or not can be determined accurately.

Furthermore, since the first area 61 and the second area 62 contain the whole of the vehicle interior space and part of the outside of the vehicle cabin, the possibility that the mobile device 2 present inside the vehicle cabin is erroneously determined to be present outside the vehicle cabin can be reduced significantly. On the other hand, since the first area 61 and the second area 62 have boundary surfaces following the right side surface and the left side surface of the vehicle C, whether the mobile device 2 is present inside the vehicle cabin or outside the vehicle cabin can be accurately determined with respect to the boundary surfaces.

While an example in which the first transmitting antenna 31 is deviated rightward from the central portion in the width direction of the vehicle C is described in the first embodiment, the present disclosure is similarly applicable to a case where it is deviated toward the left of the vehicle C.

Moreover, while the first embodiment describes an example in which the received signal strengths of the signals transmitted from the first transmitting antenna 31 and the third transmitting antenna 33 are weight-added by the received signal strength of the signal transmitted from the second transmitting antenna 32, it is unnecessary to perform the weight addition if the desired first area 61 and second area 62 can be formed. That is, a structure may be adopted in which the received signal strength of the signal transmitted from the second transmitting antenna 32 is simply added to the received signal strengths of the signals transmitted from the first transmitting antenna 31 and the third transmitting antenna 33.

Further, while the first embodiment describes an example using two transmitting antennas (3), namely, the first transmitting antenna 31 and the third transmitting antenna 33 in the vehicle cabin, a structure not using the third transmitting antenna 33 may be adopted if the desired first area 61 and second area 62 can be formed. That is, a structure may be adopted in which whether the mobile device 2 is present inside the first area 61 or not is determined by comparing the value obtained by adding the received signal strength of the signal transmitted from the second transmitting antenna to the received signal strength of the signal transmitted from the first transmitting antenna 31 with a threshold value.

Second Embodiment

Since the vehicle communication system according to the second embodiment is different from that of the first embodiment in the processing procedure of the inside-or-outside-vehicle-cabin determination, such a difference will be mainly described below. Since the structures and operational advantages other than that are similar to those of the first embodiment, the corresponding portions are denoted by similar reference designations and detailed descriptions thereof are omitted.

Figure 12:
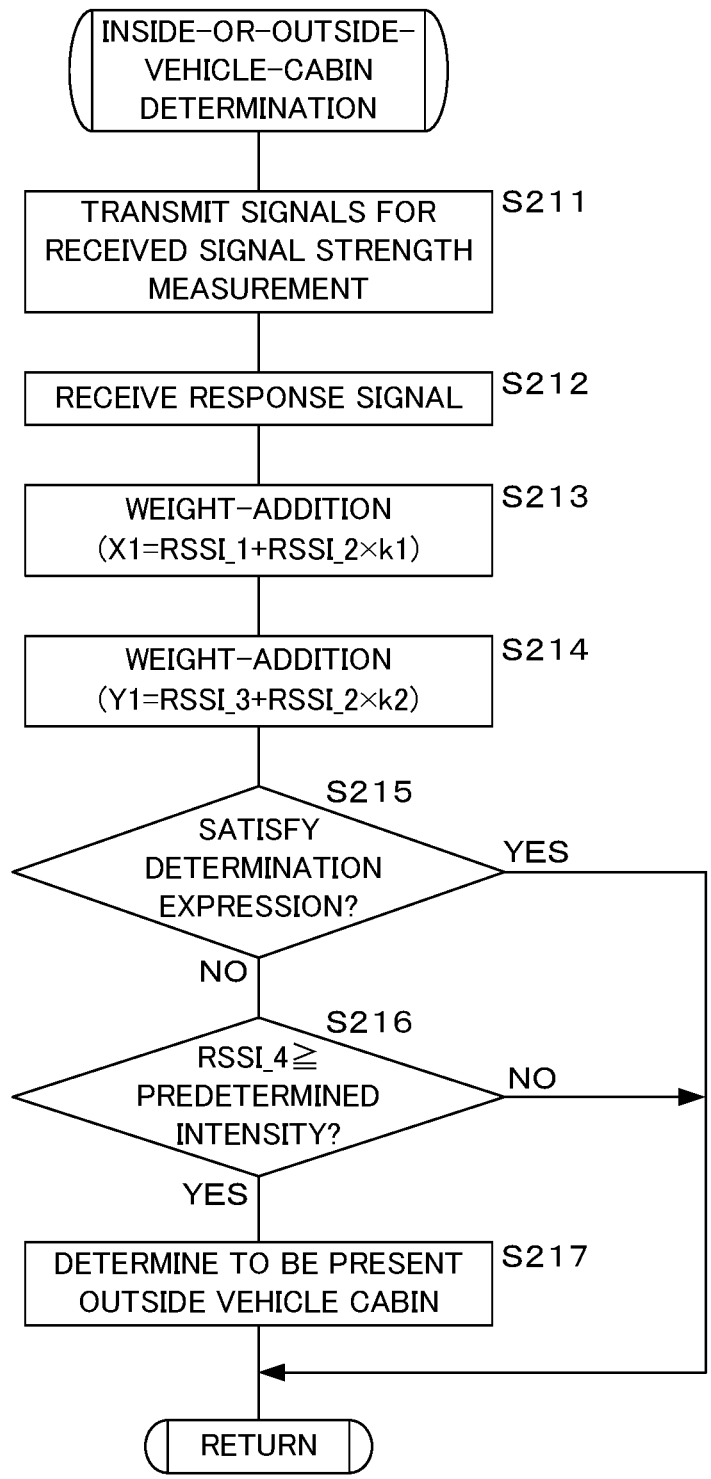
FIG. 12 is a flowchart showing a processing procedure of an inside-or-outside-vehicle-cabin determination subroutine in a second embodiment.
Figure 13A:
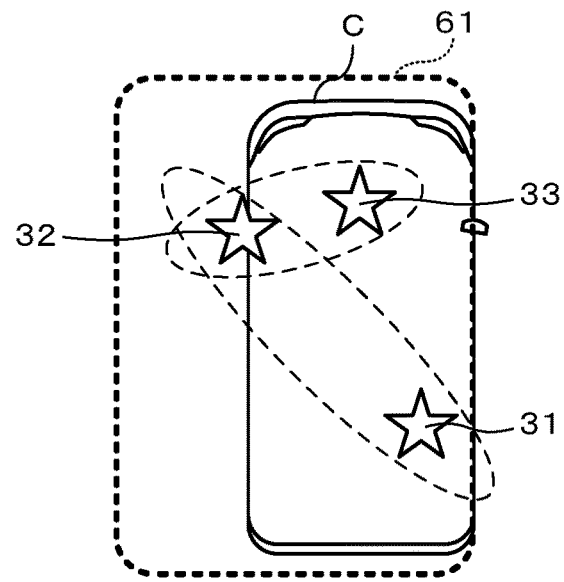
FIG. 13A is a conceptual view showing an inside-or-outside-vehicle-cabin determination method in the second embodiment.
Figure 13B:
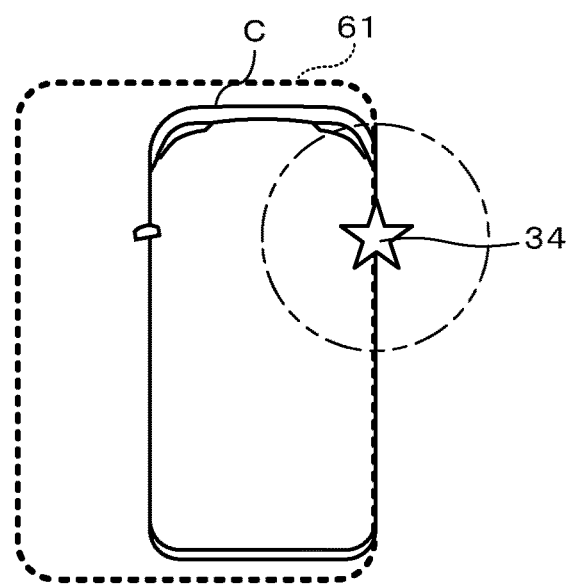
FIG. 13B is a conceptual view showing the inside-or-outside-vehicle-cabin determination method in the second embodiment.

FIG. 12 is a flowchart showing a processing procedure of the inside-or-outside-vehicle-cabin determination subroutine in the second embodiment, and FIG. 13A and FIG. 13B are conceptual views showing a method for the inside-or-outside-vehicle-cabin determination in the second embodiment. In particular, FIG. 12 shows a processing procedure suitable for the inside-or-outside-vehicle-cabin determination when the request switch on the driver seat side is operated. The control unit 11 of the vehicle-mounted device 1 causes the vehicle-mounted transmitting unit 13 to successively transmit signals for received signal strength measurement for the inside-or-outside-vehicle-cabin determination from the plurality of transmitting antennas (3) (step S211), and receives the response signal transmitted from the mobile device 2, by the vehicle-mounted receiving unit 12 (step S212). Then, the control unit 11 adds a weight to, of the received signal strengths included in the response signal received by the vehicle-mounted receiving unit 12, the received signal strength of the signal transmitted from the first transmitting antenna 31 by the received signal strength of the signal transmitted from the second transmitting antenna 32, particularly, as shown by the stars in FIG. 13A (step S213). Moreover, the control unit 11 adds a weight to the received signal strength of the signal transmitted from the third transmitting antenna 33 by the received signal strength of the signal transmitted from the second transmitting antenna 32 as shown by the stars in FIG. 13A (step S214).

Then, the control unit 11 reads the determination expressions for the first area 61 from the storage unit 14, and determines whether the values weight-added at step S213 and S214 satisfy the determination expressions or not (step S215). When determining that they satisfy the determination expressions related to the first area 61 (step S215: YES), that is, when determining that the mobile device 2 is present inside the vehicle cabin, the control unit 11 ends the processing.

When determining that they do not satisfy the determination expressions related to the first area 61 (step S215: NO), as shown in FIG. 13A, the control unit 11 determines whether the received signal strength of the signal transmitted from the fourth transmitting antenna 34 is not less than a predetermined intensity or not (step S216). In FIG. 13B, the alternate long and two short dashes line surrounding the star indicates the position where the received signal strength of the signal transmitted from the fourth transmitting antenna 34 is at a predetermined intensity. When determining that the received signal strength of the signal transmitted from the fourth transmitting antenna 34 is not less than the predetermined intensity (step S216: NO), the control unit 11 ends the processing. When determining that the received signal strength of the signal transmitted from the fourth transmitting antenna 34 is not less than the predetermined intensity (step S216: YES), the control unit 11 determines that the mobile device 2 is present outside the vehicle cabin (step S217), and ends the processing. That is, the mobile device 2 is determined to be present outside the vehicle on the driver seat side.

According to the vehicle communication system and the vehicle-mounted device 1 according to the second embodiment, the position of the mobile device 2 is determined by combining the processing to determine whether the mobile device 2 is present inside the first area 61 or not and the processing to determine whether the mobile device 2 is present in the neighborhood of the right side surface of the vehicle C or not. Regarding whether the mobile device 2 is present in the neighborhood of the right side surface of the vehicle C or not, a simple processing of comparing the received signal strength of the signal transmitted from the fourth transmitting antenna 34 with the predetermined intensity can be executed. Therefore, whether the mobile device 2 is present inside the vehicle cabin or not can be determined by a simpler processing compared with the first embodiment.

While the second embodiment describes the inside-or-outside-vehicle-cabin determination when the request switch on the driver seat side is operated, the inside-or-outside-vehicle-cabin determination can be similarly performed when the request switch on the front passenger seat side (left side) is operated. For example, whether the mobile device 2 is present inside the second area 62 or not is determined, and whether the received signal strength of the signal transmitted from the second transmitting antenna 32 is not less than the predetermined intensity or not is determined. When the mobile device 2 is present outside the second area 62 and the received signal strength of the signal is not less than the predetermined intensity, the mobile device 2 is determined to be outside the vehicle cabin.

Third Embodiment

Since the vehicle communication system according to a third embodiment is different from that of the second embodiment in the processing procedure of the inside-or-outside-vehicle-cabin determination, such a difference will be mainly described below. Since the structures and operational advantages other than that are similar to those of the first embodiment, the corresponding portions are denoted by similar reference designations and detailed descriptions thereof are omitted.

Figure 14:
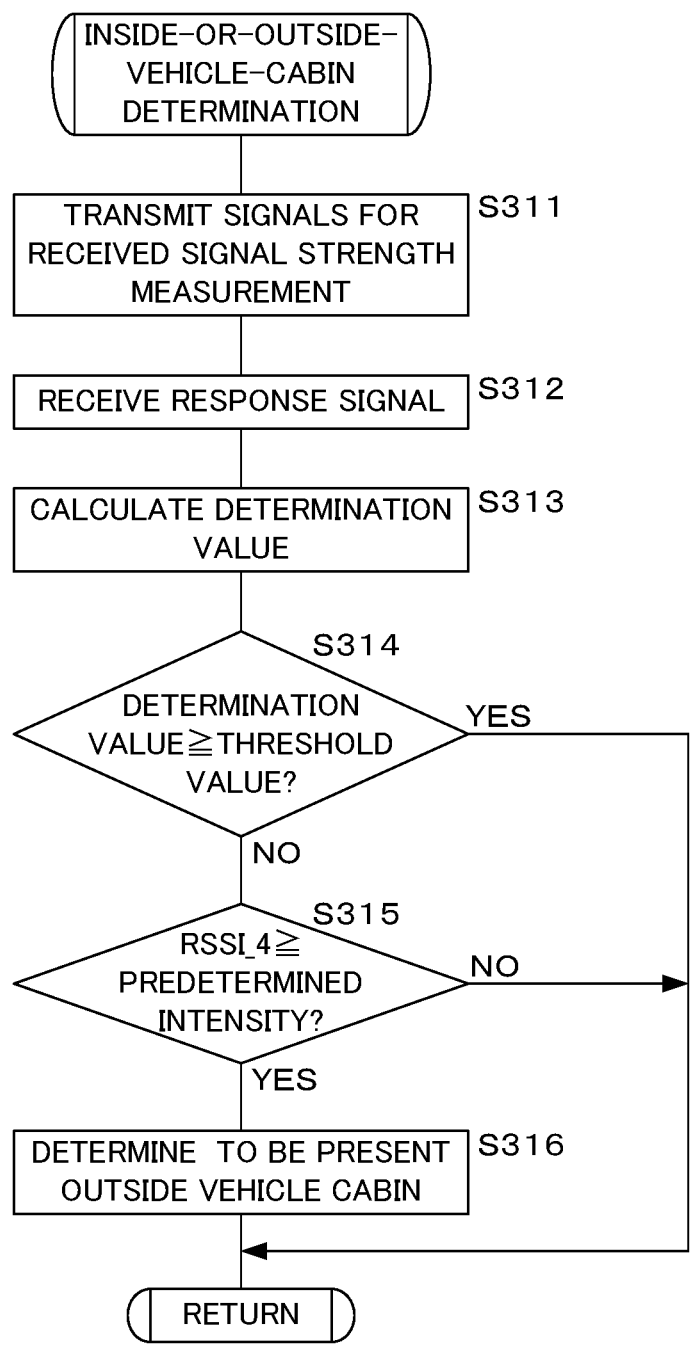
FIG. 14 is a flowchart showing a processing procedure of an inside-or-outside-vehicle-cabin determination subroutine in a third embodiment.

FIG. 14 is a flowchart showing a processing procedure of the inside-or-outside-vehicle-cabin determination subroutine in the third embodiment. In particular, FIG. 14 shows a processing procedure suitable for the inside-or-outside-vehicle-cabin determination when the request switch on the driver seat side is operated. The control unit 11 of the vehicle-mounted device 1 causes the vehicle-mounted transmitting unit 13 to successively transmit signals for received signal strength measurement for the inside-or-outside-vehicle-cabin determination from the plurality of transmitting antennas (3) (step S311), and receives the response signal transmitted from the mobile device 2, by the vehicle-mounted receiving unit 12 (step S312). Then, the control unit 11 calculates a scalar determination value for determining whether the mobile device 2 is present inside the first area 61 or not based on the received signal strengths of the signals transmitted from the first transmitting antenna 31, the second transmitting antenna 32 and the third transmitting antenna 33, respectively, (step S313).

The determination value is expressed, for example, by the following expression (5):

$$\text{the determination value}=RSSI\_1+RSSI\_3+RSSI\_2 \times k \quad (5)$$

Here,

RSSI_1 is the received signal strength of the signal transmitted from the first transmitting antenna 31, RSSI_2 is the received signal strength of the signal transmitted from the second transmitting antenna 32, RSSI_3 is the received signal strength of the signal transmitted from the third transmitting antenna 33, and k is a predetermined weight coefficient.

Then, the control unit 11 determines whether the determination value calculated at step S313 is not less than a threshold value or not (step S314). When determining that it is not less than the threshold value (step S314: YES), that is, when determining that the mobile device 2 is present inside the vehicle cabin, the control unit 11 ends the processing. When determining that it is less than the threshold value (step S314: NO), the control unit 11 determines whether the received signal strength of the signal transmitted from the fourth transmitting antenna 34 is not less than a predetermined intensity or not (step S315). When determining that the received signal strength of the signal transmitted from the fourth transmitting antenna 34 is not less than the predetermined intensity (step S315: NO), the control unit 11 ends the processing. When determining that the received signal strength of the signal transmitted from the fourth transmitting antenna 34 is not less than the predetermined intensity (step S315: YES), the control unit 11 determines that the mobile device 2 is outside the vehicle cabin (step S316) and ends the processing. That is, the mobile device 2 is determined to be present outside the vehicle cabin on the driver seat side.

According to the vehicle communication system and the vehicle-mounted device 1 according to the third embodiment, the scalar determination value is calculated by the processing of addition of the received signal strengths related to the plurality of transmitting antennas (3), and the position of the mobile device 2 can be determined by the simple arithmetic processing of comparing the determination value with the threshold value.

While the third embodiment describes an example in which the inside-or-outside-first-area determination in the second embodiment is performed by comparing the determination value expressed by the above expression (5) with the threshold value, needless to say, the inside-or-outside-first-area determination in the first embodiment may be performed by using the determination value. Moreover, the inside-or-outside-second-area determination may be performed by using the determination value. The scalar determination value for determining whether the mobile device 2 is present inside the second area 62 or not is expressed, for example, by the following expression (6):

$$\text{the determination value} = RSSI\_1 + RSS3\_ + RSSI\_4 \times k \quad (6)$$

Here,

RSSI_1 is the received signal strength of the signal transmitted from the first transmitting antenna 31, RSSI_2 is the received signal strength of the signal transmitted from the second transmitting antenna 32, RSSI_4 is the received signal strength of the signal transmitted from the fourth transmitting antenna 34, and k is a predetermined weight coefficient.

The embodiments disclosed herein should be considered as illustrative in all respects and not restrictive. The scope of the present invention is defined not by the definition given above but by the claims, and all changes that fall within the definition and scope equivalent to the claims are to be embraced.

What is claimed is:

1. A vehicle communication system comprising:
   a vehicle-mounted device having a microcomputer that transmits signals from a plurality of transmitting antennas provided on a vehicle, the plurality of transmitting antennas including:
   a first transmitting antenna provided in a vehicle cabin nearer to a first side surface in a width direction of the vehicle from a central portion, and
   a second transmitting antenna provided nearer to a second side surface in the width direction of the vehicle; and
   a mobile device that receives the signals transmitted from the vehicle-mounted device and transmits a response signal including received signal strengths of the received signals, in which the vehicle-mounted device receives the response signal transmitted from the mobile device and determines whether the mobile device is present inside the vehicle cabin or not based on the received signal strengths included in the received response signal, wherein
   the microcomputer is configured to:
   determine whether or not the mobile device is present inside an area containing a vehicle interior space and having a boundary surface following at least the first side surface in the width direction of the vehicle, based on the received signal strengths of the signals transmitted from the first transmitting antenna and the second transmitting antenna, respectively,
   adding the received signal strength of the signal transmitted from the second transmitting antenna to the received signal strength of the signal transmitted from the first transmitting antenna, and
   determine whether the mobile device is present inside the area based on a value obtained by adding the received signal strength of the signal transmitted from the second transmitting antenna to the received signal strength of the signal transmitted from the first transmitting antenna, such that a concave of an other side surface of the area in the width direction of the vehicle is corrected without distortion of the boundary surface of the area following one side surface in the width direction of the vehicle.

2. The vehicle communication system according to claim 1, wherein the microcomputer multiplies the received signal strength of the signal transmitted from the second transmitting antenna, by a weight coefficient that is less than one, and adds the weighted received signal strength to the received signal strength of the signal transmitted from the first transmitting antenna.

3. The vehicle communication system according to claim 1, wherein
   the plurality of transmitting antennas include a third transmitting antenna provided in the vehicle cabin,
   the microcomputer determines a third value by adding the received signal strength of a signal transmitted from the second transmitting antenna to a received signal strength of a signal transmitted from the first transmitting antenna,
   the microcomputer determines a fourth value by adding the received signal strength of the signal transmitted from the second transmitting antenna to a received signal strength of a signal transmitted from the third transmitting antenna, and
   the microcomputer determines whether the third and fourth values satisfy a predetermined determination expression or not.

4. The vehicle communication system according to claim 3, wherein the microcomputer is configured to:
   multiply the received signal strength of the signal transmitted from the second transmitting antenna by a first weight coefficient that is less than one, and add a weighted received signal strength to the received signal strength of the signal transmitted from the first transmitting antenna, and
   multiply the received signal strength of the signal transmitted from the second transmitting antenna by a second weight coefficient that is less than one, and add a weighted received signal strength to the received signal strength of the signal transmitted from the third transmitting antenna.

5. The vehicle communication system according to claim 1, wherein
   the plurality of transmitting antennas include a third transmitting antenna provided in the vehicle cabin,
   the microcomputer calculates a scalar determination value for determining whether the mobile device is present inside the area or not, based on the received signal strengths of the signals transmitted from the first transmitting antenna, the second transmitting antenna and the third transmitting antenna, respectively, and
   the microcomputer compares the calculated scalar determination value with a predetermined threshold value.

6. The vehicle communication system according to claim 1, wherein the area includes an entirety of the vehicle interior space and part of the outside of the vehicle and having a boundary surface following the first side surface in the width direction of the vehicle.

7. A vehicle-mounted device that transmits signals from a plurality of transmitting antennas provided on a vehicle to a mobile device and determines whether the mobile device is present inside a vehicle cabin or not based on received signal strengths of the signals received by the mobile device, the plurality of transmitting antennas including: (i) a first transmitting antenna provided in a vehicle cabin nearer to a first side surface in a width direction of the vehicle from a central portion, and (ii) a second transmitting antenna provided nearer to a second side surface in the width direction of the vehicle, the vehicle-mounted device comprising:

a microcomputer configured to:

determine whether or not the mobile device is present inside an area containing a vehicle interior space and having a boundary surface following at least the first side surface in the width direction of the vehicle, based on the received signal strengths of the signals transmitted from the first transmitting antenna and the second transmitting antenna, respectively, add the received signal strength of the signal transmitted from the second transmitting antenna to the received signal strength of the signal transmitted from the first transmitting antenna, and determine whether the mobile device is present inside the area based on a value obtained by adding the received signal strength of the signal transmitted from the second transmitting antenna to the received signal strength of the signal transmitted from the first transmitting antenna, such that a concave of an other side surface of the area in the width direction of the vehicle is corrected without distortion of the boundary surface of the area following one side surface in the width direction of the vehicle.

* * * * *